April 28, 1964   G. E. McKENNA   3,131,032
EROSION PREVENTING APPARATUS
Filed March 10, 1961
FIG. 1
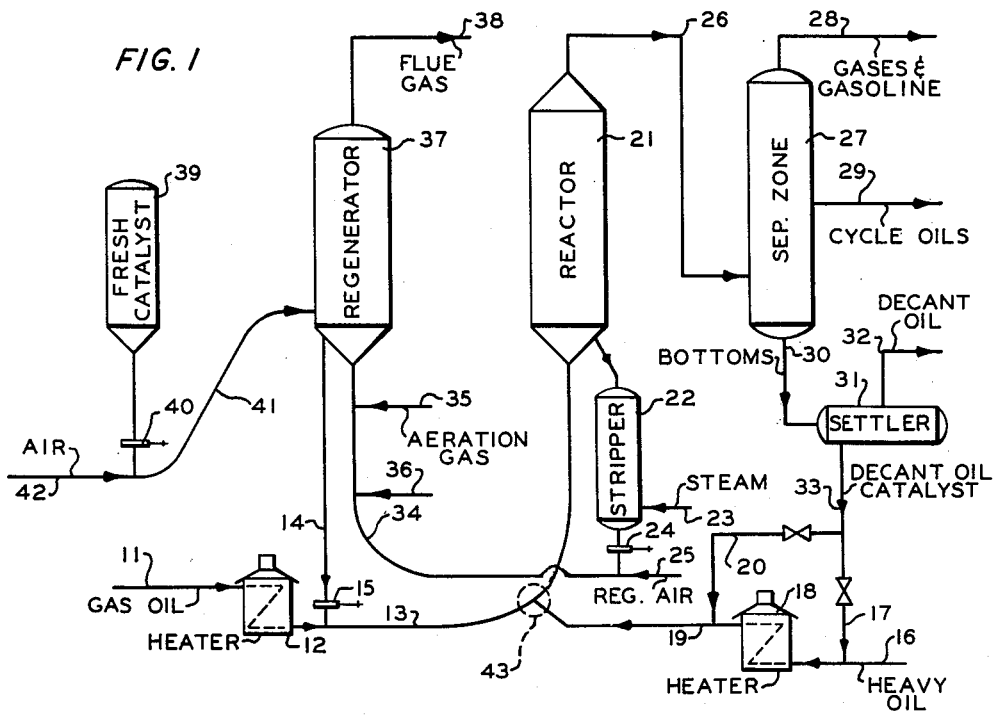
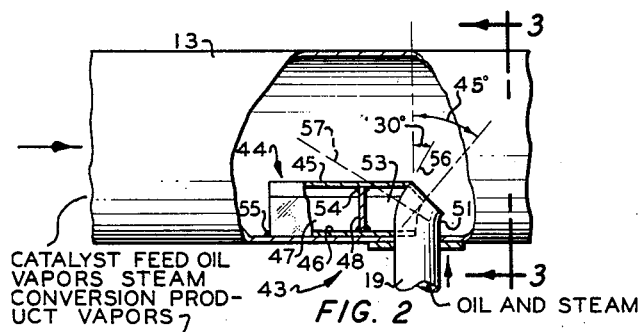
FIG. 2
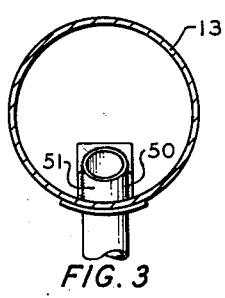
FIG. 3
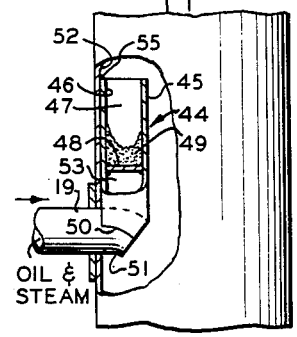
FIG. 4
INVENTOR.
G. E. MC KENNA
BY Hudson & Young
ATTORNEYS United States Patent Office 3,131,032
Patented Apr. 28, 1964

3,131,032
EROSION PREVENTING APPARATUS
George E. McKenna, Phillips, Tex., assignor to Phillips Petroleum Company, a corporation of Delaware
Filed Mar. 10, 1961, Ser. No. 94,814
2 Claims. (Cl. 23—288)

This invention relates to apparatus employed in the conversion of oils. In one aspect, it relates to apparatus for mixing a charge oil with a flowing mass of another charge oil and catalyst. In another aspect, it relates to apparatus for elimination of erosion of nozzles or conduits extending into another conduit containing a flowing mass of erosive material.

In adding a hot vaporous or partially vaporized oil feed to a heated stream of catalyst suspended in a vapor, mixing should be as nearly complete as possible and as rapid as possible to expedite the desired conversion. In transfer conduits in which solid catalyst suspended in a hot feed vapor is transferred to a conversion zone, transfer velocities are quite high as is well known in the fluidized bed conversion art. In case a second fluid or an additional amount of the hot feed is added at some point in the transfer conduit, means is provided for effecting thorough mixing of the added feed with the first fluid or vapor being transferred. At such locations, nozzles or conduits which project into a transfer conduit in which there is a rapidly flowing mass of suspended catalyst become eroded to such an extent that repair or replacement must be made. It is preferable in such an installation that the outlet of the nozzle or conduit extending into the main transfer line be directed downstream. When such an inlet conduit discharges its vapor at high velocity into the main transfer conduit at right angles, there is usually a swirling of vapors carrying entrained catalyst. Such an operation erodes the main transfer line in the vicinity of the area against which the injected vapors impinge. It is thus customary to direct the nozzle downstream, yet at an angle thereto so as to cause mixing of the injected fluid with the mass of catalyst and suspending vapor.

Solid catalyst, even though finely divided, is quite abrasive when impinged at high velocity against a metal surface. Thus, the above-mentioned nozzles or conduits extending into flowing masses of erosive and suspended catalysts become eroded and finally eaten away. When such erosion occurs, proper mixing of material in process is not accomplished.

Accordingly, one object of this invention is to provide apparatus for the mixing of a stream of vapor with another stream of vapor containing suspended catalyst. Another object of this invention is to provide apparatus for such mixing and with the provision of means for the eliminating of erosion of nozzles or conduits extending into the conduit in which the abrasive materials flow. Yet another object of this invention is to provide apparatus for the prevention of erosion of nozzles or conduits which project into a flowing mass of erosive material. Other objects and advantages of this invention will be realized upon reading the following description which, taken with the attached drawing, forms a part of this specification.

In the drawing, FIGURE 1 illustrates, in diagrammatic form, an arrangement of apparatus parts for carrying out a fluidized cracking operation which includes the apparatus of this invention. FIGURE 2 is a view, partly in section, of the apparatus of this invention. FIGURE 3 is a view taken from the line 3—3 of FIGURE 2. FIGURE 4 is a view partly in section of a variation of the apparatus of this invention.

In FIGURE 1 of the drawing, reference numeral 11 refers to a conduit for charging a gas oil to a heater 12 prior to passage through a conduit 13 into a reactor or catalyst vessel 21. Regenerated catalyst from regenerator 37 passes through a conduit 14, the flow of catalyst being regulated by a valve 15 for entry into the conduit 13. The gas oil is vaporized or substantially completely vaporized in heater 12 and the vapor serves as a transporting fluid for carrying the solid and finely divided catalyst through conduit 13 to the reactor vessel 21. Since reactor 21 has a relatively large cross section, solid catalyst settles from the vapors therein and is passed from the reactor to a stripper vessel 22 into which steam enters from the conduit 23. Steam from conduit 23 passes upward through vessel 22 stripping the catalyst of hydrocarbonaceous materials for their recovery. The stripped hydrocarbonaceous materials and steam pass upward through the reactor vessel 21 and accompanied by reaction products leave the reactor by way of the conduit 26 for fractionation in separation zone 27 into desired products. In this particular case and for illustrative purposes, the reactor effluent is separated as by fractional distillation into an overhead product comprising gases and gasoline which are removed through a conduit 28. A fraction of cycle oils, that is, oils which are at least in part recycled in many instances into the main cracking operation, is withdrawn from separation zone 27 by way of a conduit 29. The bottoms material is withdrawn by way of a conduit 30 and is passed into a settler 31. Settled material in settler 31 comprises oil called in the art "decant oil" and finely divided catalyst. Relatively catalyst-free oil as decant oil is withdrawn from the settler through an overhead conduit 32 for such disposal as desired.

Used catalyst stripped free of volatile materials in stripper 22 is withdrawn therefrom with flow being regulated by a valve 24. Regeneration air for burning off nonvolatile carbonaceous material enters the system through a conduit 25 and this air entrains stripped catalyst passing valve 24 and carries the catalyst through a conduit 35 to a regeneration vessel 37 in which combustion of the carbonaceous material on the catalyst takes place. Additional air for this combustion and for assisting in transit of the catalyst through conduit 34 is added by way of conduits 35 and 36. Flue gases leave the regenerator by way of a conduit 38 for such disposal as desired. Fresh catalyst from a fresh catalyst storage 39 is passed through a valve 40 and drops into a stream of air passing in conduit 42 for transport through a conduit 41 into the regenerator as make-up catalyst.

The decant oil-catalyst settler material from settler 31 is withdrawn therefrom and passes by way of a conduit 33 for passage through conduit 20 into a conduit 19 for addition to the main stream of catalyst and oil charge in conduit 13.

If desired, all or a portion of the decant oil-catalyst settlings of settler 31 is passed from conduit 33 through a by-pass conduit 17 for heating in a heater 18 prior to passage through conduit 19 into the main transfer conduit 13. In many instances, additional oil from a source, not shown, is passed through a conduit 16 to be combined with the decant oil and catalyst from conduit 17 for heating the heater 18.

In one instance, the gas oil entering this system through conduit 11 is a gas oil having an API gravity of 30°. The other oil which is added through conduit 16 is in one instance an oil corresponding somewhat to topped crude oil and may be the result of a vacuum distillation of crude oil. Such an oil in one case has a specific gravity at 60° at 0.95, a Cleveland open cup flash point above 600° F., and a Furol viscosity at 210° F. of greater than 60 seconds. When employing such a heavy viscous oil as this topped crude oil, it is desirable to recycle a relatively large proportion of decant oil and catalyst from conduit 33 for mixing therewith prior to the heating operation in heater 18. In this manner the heavy oil is thinned and is more easily transferred than if the oil is not mixed with the decant oil.

The operating conditions maintained in reactor 21 and the conditions maintained in regenerator 37 are conventional conditions and will not be stated herein since those conditions play no part in the present invention.

Reference numeral 43 in FIGURE 1 refers to apparatus at the point of juncture of conduit 19 with conduit 13. This apparatus is illustrated in detail in FIGURE 2. Conduit 19 is shown as entering the wall of conduit 13 at substantially right angles thereto. Inside conduit 13 is a pipe L 51 which in one instance was a 45° L. Since a flange is not needed at the outlet end of this 45° L, one method of obtaining a proper piece of apparatus is to cut in half a conventional 90° L. The left hand end of conduit 13 as illustrated in FIGURE 2 receives gas oil, that is heated gas oil, issuing from heater 12 and catalyst passing through conduit 14 and valve 15. Since the heater 12 heats the gas oil to reaction or conversion temperature, conversion of this gas oil starts immediately upon entry of catalyst from conduit 14 to conduit 13. Thus, by the time material in transit in conduit 13 reaches the apparatus illustrated in FIGURE 2, there are unconverted gas oil vapor, catalyst, steam and conversion product vapors. This mixture of fluid then passes from left to right in the apparatus illustrated in FIGURE 2. This material passes through conduit 13 at a high velocity and in so passing the catalyst tends to erode the surface of the L 51 facing the oncoming feedstream and catalyst. Thus, in order to prevent this erosion of the L 51, I provide a box 44 which is constructed of walls 45, 46 and 47, one end of the box being attached fluid-tight to the exposed surface of the L 51. While some advantage is obtained in using an entirely open box, I find it very desirable to insert into box 44 a plate 48. This plate is welded at 54 to the sidewalls of the box thereby providing an enclosed space on the side of the plate next to the L 51 and an open end box on the opposite side of plate 48. FIGURES 3 and 4 show weld 50 which attaches the ends of the sidewalls 45, 46 and 47 of the box to the L 51. In case the apparatus as illustrated in FIGURE 2 is placed in pipe 13 which is disposed in a horizontal position or in such a position that the catalyst and vapors suspending the catalyst pass in an upward direction, there will be substantially no catalyst retained in the open end of the box 44. However, when the vapors flow in a downward direction as illustrated in the embodiment of FIGURE 4, there will be a body of catalyst 49 maintained in the open end portion of box 44. This box, as illustrated in FIGURE 4, is shown as being attached to a wall 52 of the vertically positioned conduit. When a body of solid catalyst 49 is maintained in box 44 as illustrated in FIGURE 4, the catalyst provides a buffer zone for eliminating contact of the flowing catalyst with plate 48 or with the upper surface of the L 51 in case there is an opening in the plate.

Box 44 can, if desired, have four walls as the illustrations in FIGURES 2 and 4 indicate. Each of these figures shows a section of the box 44 with one wall cut away. However, if desired but not preferably, wall 46 can be omitted and wall 47 can be attached directly to the wall of conduit 13 or to the wall 52 as illustrated in FIGURE 4. The wall of the conduit is in some instances the equivalent of wall 46. Wall 46 of FIGURES 2 and 4 or walls 47 of these figures are attached to the wall 13 of FIGURE 2 or wall 52 of FIGURE 4 by welds 55.

It is noted that in the operation of such a catalytic system involving use of conduit 19 and L 51 for directing the flow of a stream of one of the oil feeds, with or without stream, into conduit 13 without the use of a box 44, catalyst flowing from left to right as in FIGURE 2 erodes a portion of the surface of L 51 exposed to the flowing stream. The left-hand surface of L 51 of FIGURE 2 is exposed to the flowing catalyst at various angles. It is also noted that catalyst impinging against the surface of L 51 at substantially right angles thereto causes little erosion of the surface at that point. Also, points near the end of the L 51 facing the oncoming catalyst are eroded to a lesser degree than other points on the surface of the L 51. The angle of impingement as used in this specification and claims is defined as the acute angle between the direction of erosive material flow and a normal to the tangent to the pipe at the contact point of the erosive catalyst material with the pipe. Thus, if a tangent is drawn at any point on the surface of L 51 which directly faces the oncoming catalyst and a normal is drawn, that is, a line perpendicular to this tangent at the point of contact of the tangent with the surface of the L, this line makes an acute angle with the direction of catalyst flow.

It has been found that at the acute angle of about 30° that the erosive effect of finely divided catalyst is a maximum. A 45° L which was placed in a conduit corresponding to conduit 13 as illustrated in FIGURE 2 developed a hole in the surface of the L facing the oncoming catalyst at an impingement angle of about 30°. Thus, this angle of maximum erosion is herein termed the "critical angle."

According to this invention, box 44 must cover the area on the surface of L 51 which includes the critical angle. For safety purposes, it is preferred, however, that box 44 cover an area not only including the area of the critical angle but also additional areas surrounding the area of maximum erosion. Ordinarily, in such construction, it is preferable that box 44 cover the entire surface of L 51 which is exposed to the oncoming catalyst.

When such a box, as box 44, is provided in the position illustrated in FIGURE 2 with a plate 48 positioned as illustrated, the box with plate 48 is very effective for preventing erosion of any point on the surface of L 51. Upon continued use of such a box with plate 48, there may come a time when a hole is actually eroded in the plate. However, when a hole erodes in plate 48 any catalyst which passes through such an opening is markedly reduced in velocity and its possible erosive effect on the adjacent surface of L 51 is much reduced. Thus, even if a hole does erode in plate 48, the remaining portion of plate 48 and the space 53 between the plate and L protect the surface of L 51 for extended periods of time.

While in FIGURE 2 there is illustrated a 45° L identified by reference numeral 51 with box 44 covering the entire upstream surface of the L, a broken line 56 is intended to be tangent to the surface of the L at an angle of 30° from the axis of the main exterior portion of conduit 19. A line 57 is drawn in FIGURE 2 normal to line 56 at the point of tangence. This line 57, by simple geometry, is at an angle of approximately 30° with the direction of flow of catalyst and vapors in conduit 13. Thus, the point of tangency, through which line 57 is drawn, is enclosed within box 44. If one were particularly saving in materials and also if one did not want to cover any more of the surface of L 51 than absolutely necessary, only a small area which includes said point of tangency would be all the area that is actually necessary to cover and protect with box 44. For safety purposes, it is at least desirable to cover an area with box 44 including angles of impingement varying from, for example, about 20° to about 40°.

The inlet nozzle or conduit protective device of this invention can be used in any conduit, regardless of its diameter, in which an abrasive material is passed.

Materials of construction of the apparatus of this invention may be selected from among those commercially available, taking into consideration operating conditions under which the apparatus is to be used. However, ordinarily, the structure will be made of the same materials as the conduit in which the apparatus is situated.

While certain embodiments of the invention have been described for illustrative purposes, the invention obviously is not limited thereto.

I claim:
1. Apparatus for conveying a suspension of abrasive particulate solids comprising:
   (1) a main conduit for said suspension;
   (2) a second smaller conduit for introducing fluid into said suspension extending transversely into and terminating within said main conduit with its terminus therein directed downstream of said main conduit;
   (3) a substantially fluid tight box shielding the upstream surface of that section of said second conduit within said main conduit from abrasive solids, said box having an open upstream end and its downstream end being contiguous with said second conduit, said box extending both longitudinally and transversely of said section substantially the width and length thereof; and
   (4) a fixed plate within said box transverse to the axis of said main conduit, spaced intermediate the upstream and downstream ends of said box, said plate extending substantially across the width and height of said box.

2. The apparatus of claim 1 wherein said second conduit is normal to said main conduit and said terminus is an L of about 45°.

References Cited in the file of this patent
UNITED STATES PATENTS

| | | |
|---|---|---|
| 610,066 | Kuser | Aug. 30, 1898 |
| 2,786,801 | McKinley et al. | Mar. 26, 1957 |
| 2,899,374 | Gomory | Aug. 11, 1959 |
| 2,937,988 | Polack | May 24, 1960 |

FOREIGN PATENTS

| | | |
|---|---|---|
| 501,591 | Germany | July 4, 1930 |
| 509,535 | Canada | Jan. 25, 1955 |
| 511,826 | Canada | Apr. 12, 1955 |